(12) United States Patent
Chiezzi et al.

(10) Patent No.: US 8,349,961 B2
(45) Date of Patent: *Jan. 8, 2013

(54) PROCESS FOR THE PREPARATION OF HIGH IMPACT VINYLAROMATIC (CO)POLYMERS GRAFTED ON AN ELASTOMER

(75) Inventors: Leonardo Chiezzi, Follonica-Grosseto (IT); Luca Monti, Mantova (IT); Aldo Longo, Montova (IT)

(73) Assignee: Polimeri Europa S.p.A., Brindisi (IT)

( * ) Notice: Subject to any disclaimer, the term of this patent is extended or adjusted under 35 U.S.C. 154(b) by 274 days.

This patent is subject to a terminal disclaimer.

(21) Appl. No.: 11/720,677

(22) PCT Filed: Dec. 6, 2005

(86) PCT No.: PCT/EP2005/013081
§ 371 (c)(1),
(2), (4) Date: Jan. 23, 2008

(87) PCT Pub. No.: WO2006/063719
PCT Pub. Date: Jun. 22, 2006

(65) Prior Publication Data
US 2009/0281246 A1    Nov. 12, 2009

(30) Foreign Application Priority Data
Dec. 16, 2004   (IT) .............................. MI2004A2401

(51) Int. Cl.
*C08F 279/02* (2006.01)

(52) U.S. Cl. ........ 525/259; 525/240; 525/241; 525/242; 525/243; 525/256; 525/313; 525/902; 526/204

(58) Field of Classification Search .................. 525/256, 525/242, 240, 241, 243, 259, 313, 902; 526/204
See application file for complete search history.

(56) References Cited

U.S. PATENT DOCUMENTS

| 5,166,260 A | * | 11/1992 | Buonerba et al. ............... 525/52 |
| 6,255,402 B1 | | 7/2001 | Boutillier et al. |
| 6,262,179 B1 | | 7/2001 | Nicol |
| 6,815,500 B1 | | 11/2004 | Boutillier |

FOREIGN PATENT DOCUMENTS

| DE | 100 30 618 | | 1/2002 |
| EP | 0 735 064 | | 10/1996 |
| FR | 2791060 | * | 9/2000 |
| JP | 1 279 945 | | 11/1989 |
| WO | 00 77 078 | | 12/2000 |
| WO | 2004 072172 | | 8/2004 |
| WO | 2005 100 425 | | 10/2005 |

OTHER PUBLICATIONS

Machine Translation of FR2791060 (2011).*
U.S. Appl. No. 11/578,412, filed Oct. 13, 2006, Longo, et al.

* cited by examiner

*Primary Examiner* — Mark Kaucher
(74) *Attorney, Agent, or Firm* — Oblon, Spivak, McClelland, Maier & Neustadt, L.L.P.

(57) ABSTRACT

A process for the preparation of vinylaromatic (co)polymers grafted on an elastomer comprising a rigid matrix consisting of vinylaromatic polymers or copolymers and of an elastomeric phase dispersed in the matrix in form of particles with a strictly bimodal distribution which comprises the functionalization of a first elastomeric fraction by means of a catalytic system containing a stable free radical initiator and subsequently the polymerization of the thus obtained mixture also in presence of a second non functionalized elastomeric fraction.

16 Claims, 6 Drawing Sheets

Figure 1:
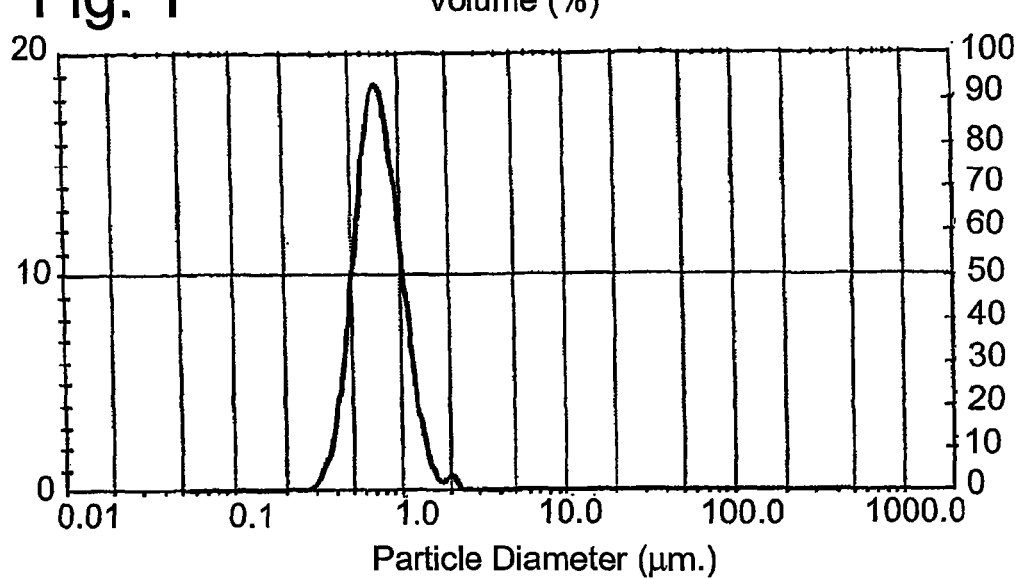

PROCESS FOR THE PREPARATION OF HIGH IMPACT VINYLAROMATIC (CO)POLYMERS GRAFTED ON AN ELASTOMER

The present invention refers to a process for the preparation of high impact vinylaromatic (co)polymers grafted on an elastomer.

More in detail, the present invention refers to a process for the preparation of compositions comprising a rigid matrix constituted by vinylaromatic polymers or copolymers and by an elastomeric or rubbery phase dispersed in the matrix in form of particles with a strictly bimodal distribution.

Even more in detail, the present invention refers to a process for the preparation of high impact polystyrene (HIPS) containing an elastomeric phase dispersed in the matrix in form of particles with a strictly bimodal distribution.

The term "strictly bimodal distribution" as it is used in the above description and in the claims is intend to indicate a set of elastomer particles, randomly dispersed into a rigid polymeric matrix, in which said particles are subdividable in a first class of particles (prevalent mode) of volume average dimension from 0.15 to 0.50 μm and in a second class of particles (subvalent mode) of volume average dimension from 1 to 8 μm, and with a total absence of particles with inter-mediate dimensions between the two previous classes. The volumetric average diameter ($D_v$) or [$D(4,3)$] of the particles is the appropriate diameter average to use when we want to keep in consideration the contribution that each particle gives to the fractionary volume of the dispersed phase (GEL PHASE). It is equivalent to the ratio between the statistical moments, respectively of $4^{th}$ degree [$\Sigma N_i(D_i)^4$] and of $3^{rd}$ degree [$\Sigma N_i (D_i)^3$] in the statistical distribution of the diameters of the particles and it is expressed with the following general formula:

$$D_v = D(4,3) = \Sigma N_i(D_i)^4 / \Sigma N_i(D_i)^3$$

where $N_i$ and $D_i$ represent the number $N_i$ of particles having the $D_i$ diameter (R. D. Cadle "Particle Size Analysis" New York (1965) pages 27-50) and it can easily be determined experimentally:

by means of electronic microscopy (T.E.M.) on thin layers of polymer, for instance HIPS, with osmium tetroxide as a contrast mean, followed by the acquisition of the apparent diameters of the particles, their elaboration and the application of a stereological correction for the thickness of the thin layer;

by means of laser granulometry (L.G.), with methylethylketone as the medium for suspension, on the samples in granules after reheating them at 280° C. in nitrogen for a time sufficient to extensively reticulate the rubbery particles, minimizing the swelling phenomena, while in suspension in methylethylketone.

For an easier use of the method, in the process object of the present invention the intervals defined for the dimensions of the particles and the experimental measurements refer to the laser granulometry (L.G.) method, considering that:

$$D(4,3)[T.E.M.] = k \cdot D(4,3)[L.G.] + h$$

where k an h are parameters which can be obtained by calibration with a certain number of samples and, in the present case, have respectively the value of 0.76 and 0 relative to the instrument MS MASTERSIZER MICROPLUS of the MALVERN company.

It is known that the chemo-physical characteristics and the mechanical properties of the vinylaromatic polymers reinforced with rubber, in particular the high impact polystyrene, depend on a multiplicity of factors among which the dimensions of the reticulated rubber particles grafted on the polymeric matrix.

It is also known that certain properties, such as impact resistance and surface gloss, in particular in the HIPS, are influenced in two opposite ways by the average dimension and by the distribution of the diameters of the rubber particles for a given concentration of rubber. Precisely, the "big" particles increase the impact resistance of the material at the expense of the gloss, while the "small" particles reduce its tenacity but make the material very glossy.

Various methods have been proposed in the literature to obtain rubber reinforced vinylaromatic (co)polymers having a good surface gloss coupled, at the same time, with a good impact resistance, for instance rubber reinforced polystyrenes. For instance, one of said methods entails the addition, in the polymeric matrix, of a limited number of "big" particles to a majority of "small" particles already present. The thus obtained products are generically defined as high impact vinylaromatic polymers with bimodal distribution of the dimensions of the rubber particles.

In the case of HIPS, said combination leads to obtain a product with a positive synergy in impact resistance coupled with an excellent surface gloss.

For instance, the U.S. Pat. No. 4,153,645 describes a HIPS with an improved balance of properties obtained mechanically mixing (melt-blending) 50-85% in weight of a high-impact polystyrene containing fine rubber particles (with an average diameter of about 0.2-0.9 μm) with 15-50% in weight of a high-impact polystyrene containing bigger rubber particles (average diameter of about 2-5 μm). According to said patent, the final obtained product, by blending the two HIPS, shows values of impact resistance or resistance to bending higher than those that would be expected applying the rule of mixtures without showing any deterioration of the other physical properties.

Using the same type of process (melt-blending), the U.S. Pat. No. 4,493,922 describes a HIPS with bimodal morphology constituted by 60-95% in weight of "capsule" particles, having a diameter from 0.2 to 0.6 μm and by 40-5% in weight with particles with "cell" and/or "coil" morphology having a diameter from 2 to 8 μm.

U.S. Pat. Nos. 4,221,883, 4,334,039, 4,254,236; EP(D)M 15,752 and 96,447 and the international patent petitions WO98/52985 and WO/09080 describe the so called process of "split-feed polymerization" to produce HIPS with bimodal morphology which allows the improvement of the impact-glossiness balance. According to said type of process, in two thirds of a prepolymerization reactor the prevalent mode with small particles is produced, by feeding a solution of a low viscosity polybutadienic rubber in styrene or a solution in styrene of a block copolymer with appropriate composition. In the remaining third of the reactor a second solution in styrene of high viscosity polybutadienic rubber is fed. The high viscosity polybutadiene in con-tact with the previously formed prepolymer undergoes a rapid phase inversion forming big particles, scarcely grafted and not easy to modulate in their dimensions.

In the U.S. Pat. No. 5,240,993 a method is described ("parallel polymerization") for the preparation of high-impact vinylaromatic polymers, characterized by a bimodal distribution of the rubber phase, according to a process in continuous mass where two plug flow reactors in parallel are used. In one of the two reactors a first prepolymer containing a rubber phase with small particles is prepared, while in the other reactor a second prepolymer containing a rubber phase with big particles is prepared. At the exit of the two reactors the polymeric streams are mixed and the polymerization is completed in a third reactor, always of the plug type, called the finishing reactor.

A simplified version of the "parallel polymerization" process is described in the international patent petition WO97/39040, according to which big particles are produced in the first half of a prepolymerization reactor, feeding an appropriate solution of high viscosity rubber in a vinylaromatic monomer in conditions such to guarantee a good efficiency of grafting and an accurate dimensional control. In the second half of said reactor, the big particles prepolymer is mixed, in appropriate proportions, with a second fine particles prepolymer, previously produced in a reactor placed in series with the first.

The disadvantages in the above described processes are mainly those of requiring:

in the case of "melt blending", the use of a compounding phase with the consequence of an increase of production costs or the preparation of HIPS components difficult to commercialize as such;

in the case of "parallel polymerization" or of the "split-feed polymerization", the development and the building assemblage of industrial plants configured in a much more complex way (prepolymerization reactors in parallel, delayed feeds of rubber solutions, reactor complete with partition diaphragm) and equipped with control systems much more sophisticated than the conventional plants with polymerization reactors in series, used for the production of conventional HIPS;

in both cases, the production of the rubber phase with "small" particles requires the compulsory use either of styrene-butadiene copolymer blocks and/or radial structure (low viscosity) polybutadienes which are known for their high commercial cost.

Besides the systems which envisage the preparation of vinylaromatic copolymers with bimodal distribution of the reinforcing rubber particles by means of mixing pre-formed products, various alternative "chemical" methods have been proposed which allow to obtain said particular morphologies by operating on the reaction mixture formulations and allow the use of conventional production assets used for the traditional HIPS.

For instance, the European patent EP 418,042 describes a method to produce rubber reinforced vinylaromatic polymers in which the particles have "generally bimodal" distribution or a broaded distribution and including, besides the prevalent fine mode (0.1-0.8 µm) and the subvalent big mode (2-6 µm), also a third class of particles with intermediate dimensions (0.8-2.0 µm). Said distribution is obtained with a medium cis polybutadiene characterized by a bimodal distribution of the molecular weights and commercialized with the name ASAPRENE 760 A.

Similarly, the European patent EP 731,016, describes how to obtain bimodal morphology HIPS using a conventional setup of reactors with an elastomer phase (dissolved in styrene) constituted by a medium cis and low viscosity polybutadiene and by a high cis high viscosity polybutadiene.

The European Patent 726,280 describes how to obtain bimodal morphology HIPS, introducing special concentrations of stable nitroxyl radicals in the HIPS polymerization with a conventional setup of reactors. Similarly, the patent petition WO 03/033559 describes pseudo-bimodal morphology HIPS obtained introducing special concentrations of functionalized nanocomposite materials in the polymerization of HIPS with a conventional setup of reactors. The function of the nanocomposite material is that of transforming a part of the big rubber particles in small rubber particles.

In all said patents, however, the proposed methods have, at least, the disadvantage of not supplying any "strictly bimodal" distribution of rubber particles. They only supply "generally bimodal" or simply "broad" distributions and, also, do not allow to control the ratio between "prevalent" and "subvalent" mode.

Finally, in the European Patent EP 620,236 a method is proposed to obtain "bimodal" distribution HIPS. According to said method, a small quantity of HIPS with big particles is dissolved in styrene together with the polybutadienic rubber or with the styrene-butadiene block copolymer necessary to produce the small particles prevalent mode. The thus obtained solution is then polymerized with a conventional reactor setup. Through-out the whole polymerization the reticulated rubber particles of preformed HIPS are not subjected to back-inversion, but maintain their structure and dimensions unchanged, while the polybutadienic rubber or the styrene-butadiene copolymer produce fine particles with corresponding structure and dimensions. The fundamental limit of the proposed technical solution of said patent is represented by the maximum percentage of preformed HIPS that can be dissolved in styrene together with the rubber (less than 5%).

Moreover, it must be noted that, according to the most conventional ways of the state of the art, polymerizing the vinylaromatic monomer and a mixture formed by polybutadiene and a polystyrene-polybutadiene blocks rubber, with a traditional setup of reactors, the structure of the corresponding high-impact (co)polymer is not strictly bimodal, not even increasing the ratio η[PB]/η[S–B] from 6 to 25, where with η we intend the viscosity in a solution at 5% in styrene monomer at 25° C.

The Applicant has now found a process for the preparation in a controlled way of vinylaromatic (co)polymers grafted on elastomer, through a catalytic system which comprises a stable radical initiator, which allows to obtain a final product in which the distribution of the diameters of the particles of the dispersed elastomeric phase is "strictly bimodal" and does not necessarily depend on the type of elastomer used, which could also be polybutadiene. Moreover, if solvent is being used in the polymerization phase, the final non reacted product (solvent+monomer) recovered after the devolatilization or stripping phases needs not to be separated in its single constituents, but can be used and recycled as such, envisaging, at the most, a phase-out of a possible polar monomer, if present, as for instance derivates from the acrylic or methacrylic acid, to favor the solution of the elastomer.

Therefore, it is an object of the present invention a process for the preparation of high-impact vinylaromatic (co)polymers, grafted on elastomer comprising a rigid matrix constituted by vinylaromatic polymers or copolymers and by an elastomeric phase dispersed in the matrix in form of particles with a strictly bimodal diameter distribution which comprises:

i) functionalizing a first portion ($X_1$) of elastomer with a catalytic system of functionalization/polymerization constituted by a free radical initiator (G), with F functionality, capable of extracting a proton from the elastomer polymeric chain, and a stable free radical initiator, comprising the group =N—O and the group =N—O—R' (I), with molar ratios (I)/G·F from 1 to 3, preferably from 1 to 2, F being equal to the number of functional groups per initiator molecule which, through decomposition, produces two free radicals, R' being an (iso)alkyl radical $C_1$-$C_6$ or a aryl alkyl radical $C_7$-$C_{20}$ possibly containing heteroatoms as N, O, S. R' is preferably a 2-phenyethyl or a 2-methyl-2-cianoproyl.

ii) mixing the functionalized elastomer with a second portion ($X_2$) of elastomer for a sufficient time to obtain a homogeneous composition;

iii) adding the homogeneous elastomeric composition to a liquid phase essentially composed of a vinylaromatic monomer/polymerization solvent mixture with a weight ratio from 60/40 to 90/10, with a weight ratio $X_1+X_2$/vinylaromatic monomer higher or equal to 8/92, generally from 8/92 to 22/78;

iv) polymerizing the vinylaromatic monomer, possibly in presence of one or more comonomers, with a temperature higher or equal to 120° C.;

v) retrieving the vinylaromatic polymer obtained at the end of the polymerization; and vi) possibly recycling the solvent/monomer mixture, coming from the retrieving phase, at stage (i), following the separation of possible polar monomers.

DETAILED DESCRIPTION OF THE INVENTION

FIG. 1: laser granulometer analysis of the polymer from Example 1.

Figure 2:
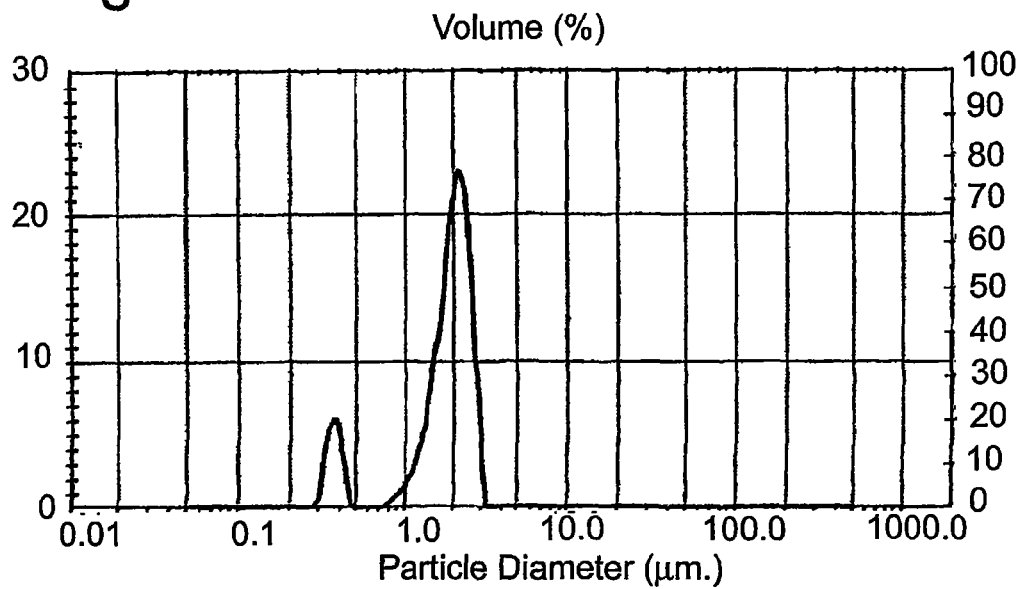

FIG. 2: laser granulometer analysis of the polymer from Example 2.

Figure 3:
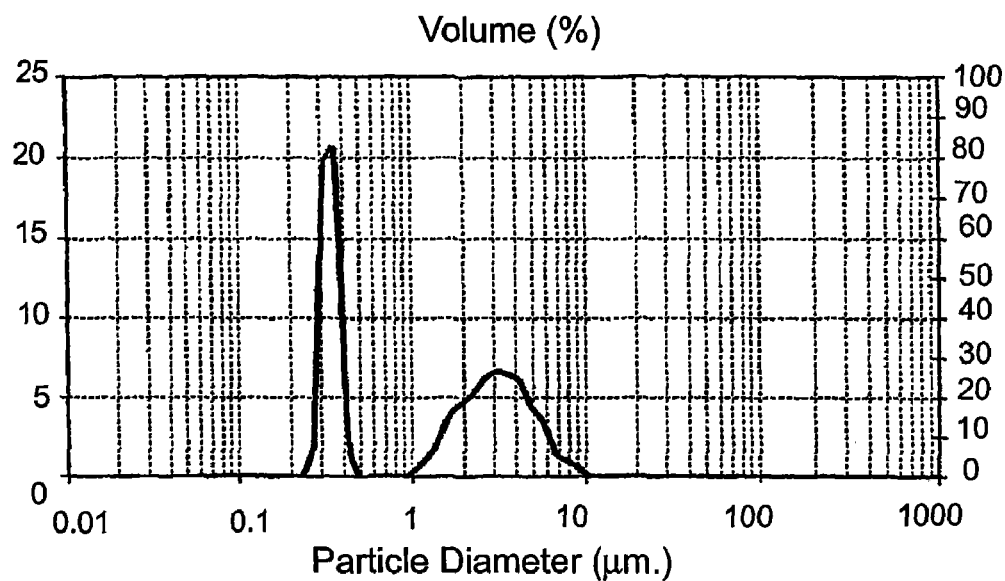

FIG. 3: laser granulometer analysis of the polymer from Example 3.

Figure 4:
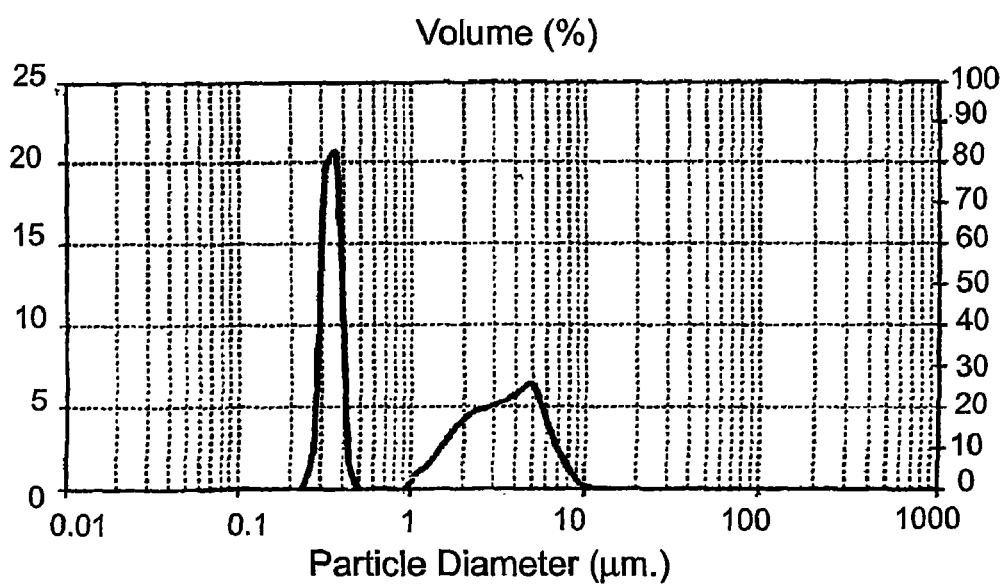

FIG. 4: laser granulometer analysis of the polymer from Example 4.

Figure 5:
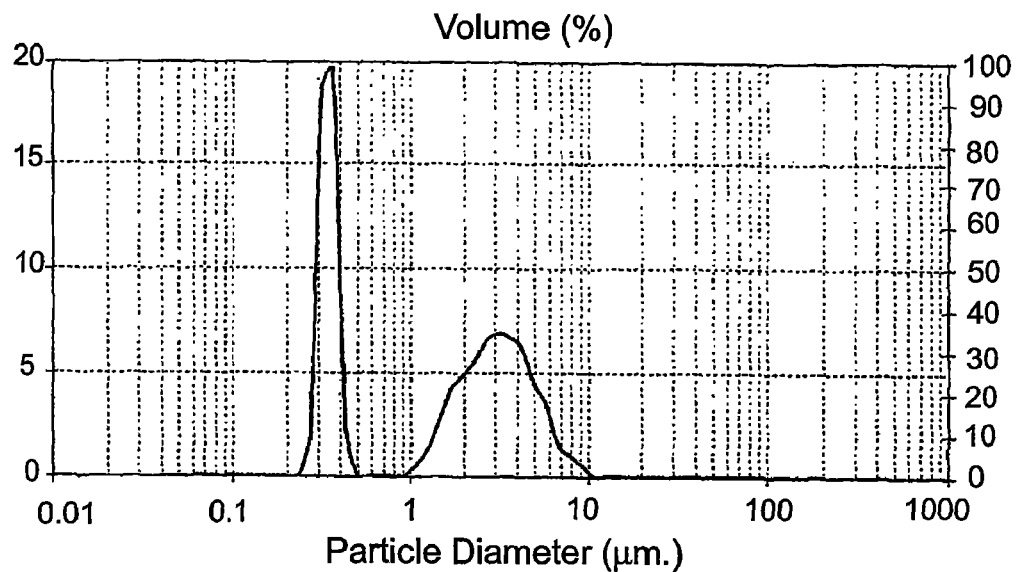

FIG. 5: laser granulometer analysis of the polymer from Example 5.

Figure 6:
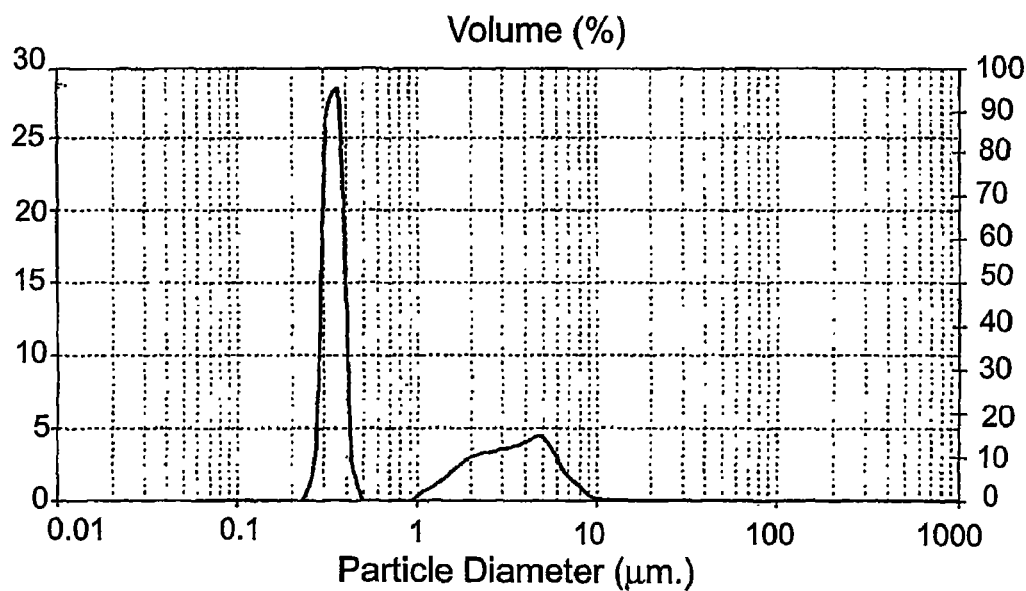

FIG. 6: laser granulometer analysis of the polymer from Example 6.

Figure 7:
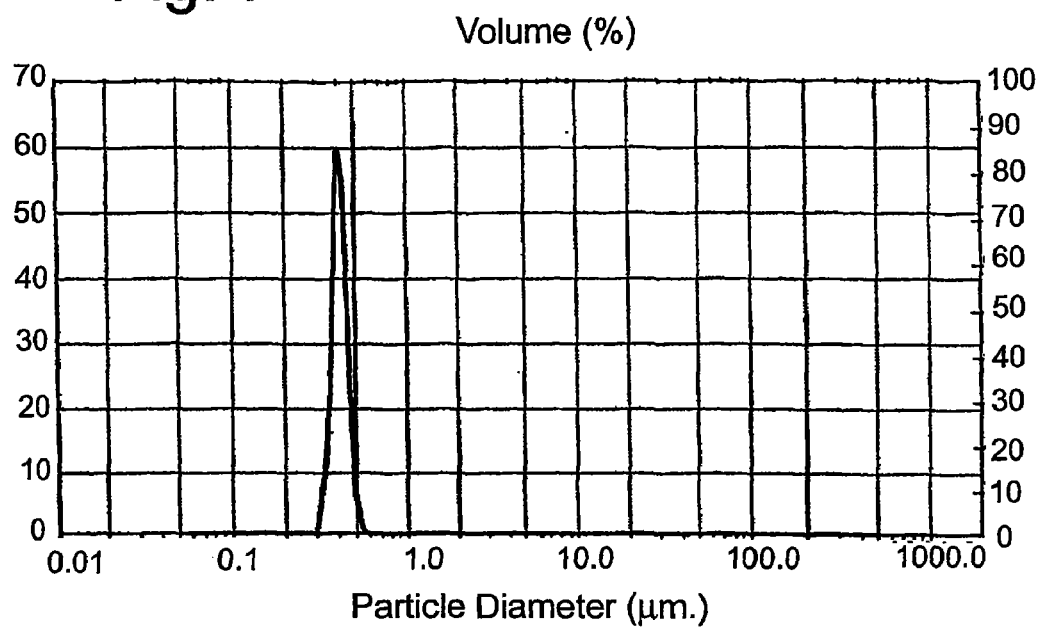

FIG. 7: laser granulometer analysis of the polymer from test 1.

Figure 8:
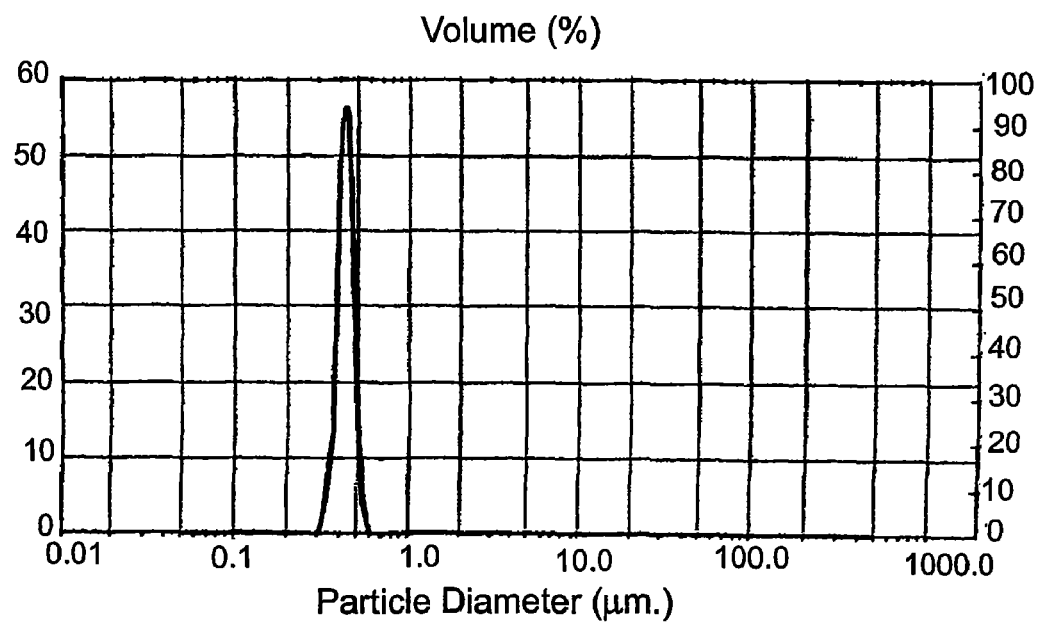

FIG. 8: laser granulometer analysis of the polymer from test 2.

Figure 9:
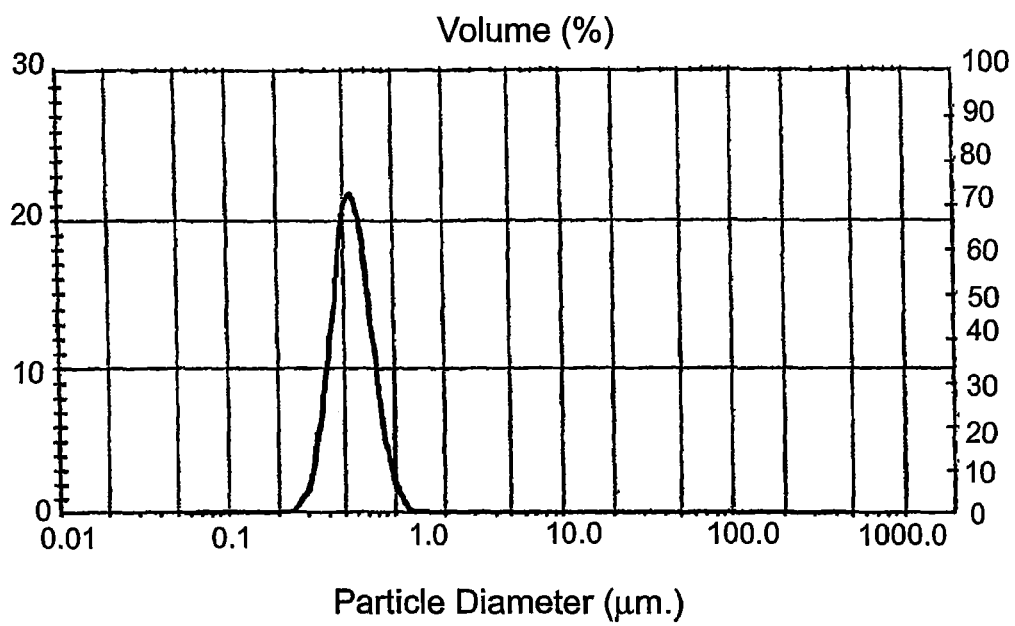

FIG. 9: laser granulometer analysis of the polymer from test 3.

Figure 10:
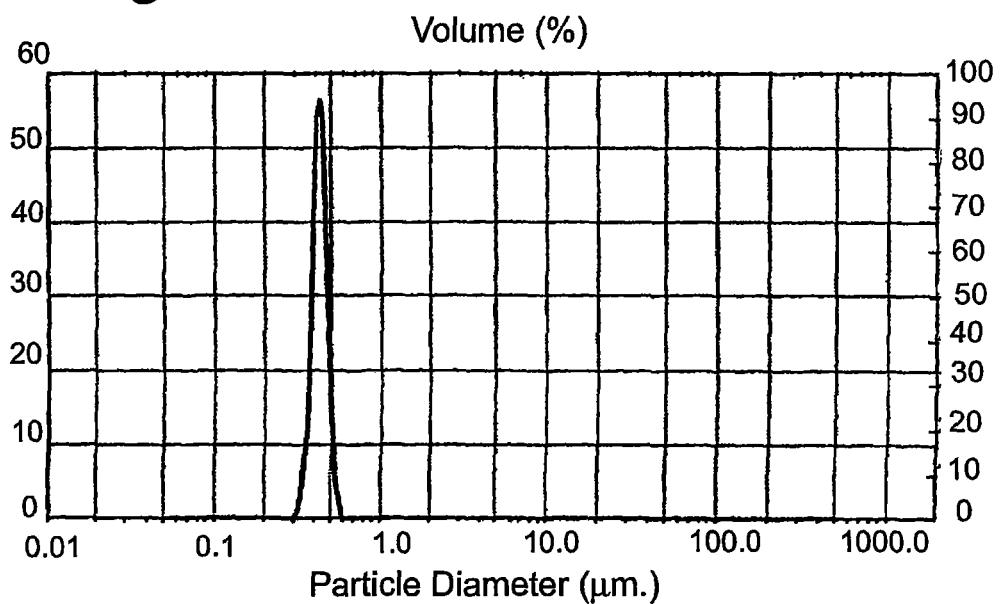

FIG. 10: laser granulometer analysis of the polymer from test 4.

Figure 11:
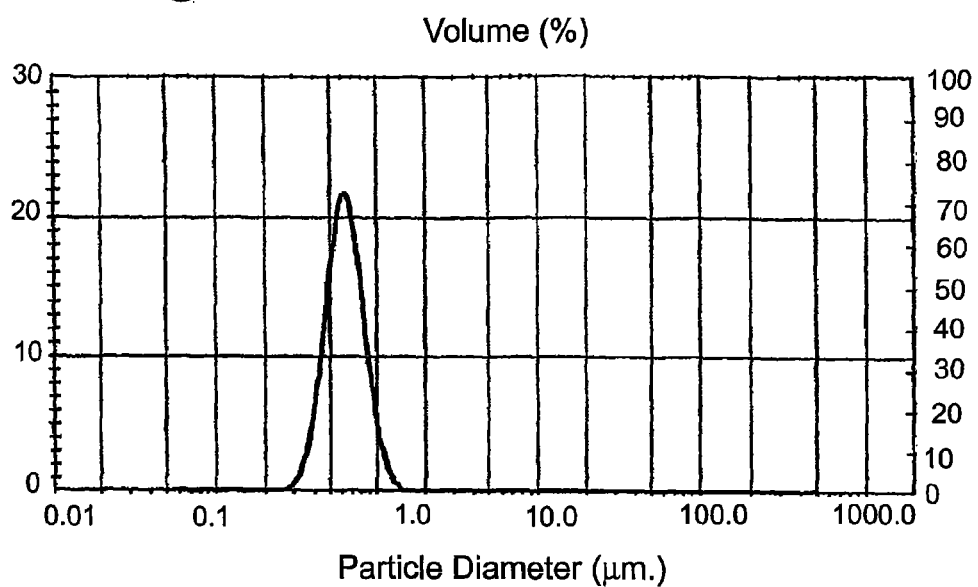

FIG. 11: laser granulometer analysis of the polymer from test 5.

Any method of functionalization of the elastomer can be used in the process object of the present invention. Generally, it is preferred to functionalize the elastomer in its molten state or in solvent. In the first case, the elastomer and the catalytic system are loaded in an extruder, or a similar device of the Brabender type, brought to temperature and maintained in said condition for a time sufficient to obtain the functionalization of the elastomer. After cooling and consolidating, the functionalized elastomer can also be pre-served for some days before being processed according to the present invention.

In the second case the elastomer and the catalytic system are dissolved in an especially devoted solvent, for instance the same solvent used during the polymerization, and the functionalization occurs at a temperature below 110° C., preferably from 80 to 110° C. Thereafter, the thus obtained functionalized solution is transferred for the following polymerization phases.

Solvent, when different from that of polymerization, is inert for the components of the catalytic system and has a boiling temperature higher than the functionalization temperature.

At the end of the functionalization, the functionalized portion is mixed with the remaining non functionalized portion. Said mixing operation preferably occurs in a solvent, maintaining the two portions in contact for the time essentially necessary to obtain a homogeneous composition. At the end, it is preferable to feed the thus obtained homogeneous composition directly to the polymerization without intermediate storage.

The mixing of the portions occurs in a solvent. The latter can be the same solvent used in the functionalization and/or polymerization phase.

In the case of functionalization and mixing in the presence of same polymerization solvent, it is possible to carry out the process object of the present invention according to an alternative method.

It is therefore a further object of the present invention a process for the preparation of high-impact vinylaromatic (co) polymers grafted on elastomer comprising a rigid matrix constituted by vinylaromatic polymers or copolymers and an elastomeric phase dispersed in the matrix in form of particles with a strictly bimodal diameter distribution comprising:

a) dissolving a first portion of the elastomer ($X_1$) in a liquid phase composed of a mixture of vinylaromatic monomer/solvent of polymerization with a weight ratio from 60/40 to 100/0, preferably from 60/40 to 90/10, with an elastomer/vinylaromatic monomer ratio higher or equal to 8/92, generally from 8/92 to 22/78;

b) adding to the solution a catalytic system of functionalization/polymerization constituted by a free radical initiator (G), with F functionality, capable of extracting a proton from the elastomer polymeric chain and a stable free radical initiator, comprising the group =N—O and the group =N—O—R' (I), with molar ratios (I)/G·F from 1 to 3, preferably from 1 to 2, F being equal to the number of functional groups per molecule of initiator which, through decomposition, produces two free radicals, R' being an (iso)alkyl radical $C_1$-$C_6$ or a aryl alkyl radical $C_7$-$C_{20}$ possibly containing heteroatoms as N, O, S. R' is preferably a 2-phenyethyl or a 2-methyl-2-cianoproyl;

c) heating, while stirring, the mixture obtained in stage (b) to a temperature from 80 to 110° C., for a sufficient time to obtain the functionalization of the elastomer;

d) feeding in the mixture, containing the functionalized elastomer in solution, the second portion of the elastomer ($X_2$), and possibly a solvent and/or vinylaromatic monomer and/or comonomers, homogenizing the resulting mixture and polymerizing at a temperature higher or equal to 120° C., preferably from 120 to 200° C.;

e) recovering the vinylaromatic polymer obtained at the end of polymerization; and f) possibly recovering the solvent/monomer mixture, coming from the retrieving phase, to stage (a), after the separation of possible polar comonomers.

According to the process of the present invention, it is possible to produce a vinylaromatic (co)polymer reinforced with elastomer with a strictly bimodal distribution, where it is possible to control the ratio between small and big particles simply by controlling the weight ratio between the first portion, $X_1$, and the second portion, $X_2$, of elastomer, before and after the functionalization/dissolution phase of the elastomer. The preferred ratios in weight $X_1/X_2$ are from 99/1 to 40/60.

According to the present invention, the process of preparation of the vinylaromatic polymer can be realized in mass, in presence of a solvent, in a batch, semi-batch or continuous type of process. The preferred process according to the present invention is the continuous process described, for instance, in the European Patent EP 400,479.

Alternatively, the process object of the present invention can be realized in a totally equivalent way with a batch process in mass-suspension using stirred autoclaves of the batch-reactor type. In such instance, after dissolving and homogenizing the elastomeric fractions $X_1$ and $X_2$, the mass is heated, polymerized until the phase inversion occurs and subsequently it is transferred in autoclaves containing water, where the polymerization continues "in suspension" according to conventional methods.

With the term "vinylaromatic (co)polymer", as used in the present description and in the claims, we essentially mean a (co)polymer obtained from the (co)polymerization of at least a monomer corresponding to the following general formula (II):

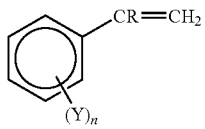

where R is hydrogen or a methyl group, n is zero or an integer from 1 to 5 and Y is a halogen, as chlorine or bromine, or an alkyl or alkoxy radical having from 1 to 4 carbon atoms.

Some examples of vinylaromatic monomers having the above identified general formula are: styrene, α-methylstyrene, β-methylstyrene, ethylstyrene, butylstyrene, dimethylstyrene, mono-, di-, tri-, tetra- and penta-chlorostyrene, bromo-styrene, methoxy styrene, acetoxy styrene, etc. The preferred vinylaromatic monomers are styrene and/or α-methylstyrene.

The vinylaromatic monomers of general formula (I) can be used on their own or in a mixture up to 50% in weight with other copolymerizable monomers. Some examples of said monomers are: the (meth)acrylic acid, the alkylic esters $C_1$-$C_4$ of the (meth)acrylic acid such as methyl acrylate, methyl methacrylate, ethyl acrylate, ethyl methacrylate, isopropyl acrylate, butyl acrylate, amides and nitriles of the (meth)acrylic acid such as acrylammide, methacrylamide, acrylonitrile, methacrylonitrile, butadiene, ethylene, divinylbenzene, maleic anhydride, etc. The preferred copolymerizable monomers are acrylonitrile and methyl methacrylate.

Any elastomer usable as a reinforcing product in a vinylaromatic (co)polymer can be used in the process object of the present invention. However, the preferred product, for its economic advantage, is the polybutadiene homopolymer with a numeric average molecular weight (Mn) from 50,000 to 350,000 and a weighted average molecular weight (Mw) from 100,000 to 500,000. Alternatively, it is also possible to use the ethyl-propylene elastomers (EPR) or the EPDM (Ethylene-Propylene-Diene Monomer).

Other elastomers which can be used in a mixture with polybutadiene can be chosen among the homopolymers and the copolymers of 1,3-alkadienes containing 40-100% in weight of monomer 1,2-alkadiene, for instance butadiene, isoprene or pentadiene, and 0-60% in weight of one or more monomers which are monoethylenically unsaturated monomers chosen among styrene, acrylonytril, α-methylstyrene, methylacrylate and ethylacrylate.

Some examples of 1,3-alkadienes are the styrene-butadiene blocks copolymers such as the two block linear elastomers of the type S-B where S represents a polystyrenic block of weighted average molecular weight Mw from 5,00 to 80,000 while B represents a polybutadienic block with weighted average molecular weight from 2,000 to 250,000. In said elastomers the quantity of block S ranges from 10 to 50% in weight relative to the total of the copolymer S-B. The preferred product is the styrene-butadiene block polymer having styrene content in weight of 40% and a viscosity, measured at 23° C. in a solution at 5% in weight of styrene, from 35 to 50 CPS.

Other examples of elastomers which can be used in the process object of the present invention are those mentioned in the European Patent 606,931. Whatever the used elastomer, it is used with a final concentration from 5 to 16% relative to the sum of the elastomer+vinylaromatic monomer+solvent.

The above described elastomers can be dissolved in a liquid phase comprising the vinylaromatic monomer and a polymerization solvent. The preferred solvent, according to the present invention is ethylbenzene, but other aromatic solvents can be used, such as the toluene or the xylenes, or the aliphatic solvents, such as hexane or cyclohexane.

The catalytic system of functionalization and polymerization is used in quantities from 0.1 to 2.5% in weight, relative to the elastomer total. The catalytic system is constituted by a free radical initiator and by a stable free radical initiator, with the above cited ratios. Surprisingly, in the case of elastomer functionalization as described in stage (c) there is not any substantial formation of polymer which, if it should ever form, does not exceed 2% in weight, and no reticulation of the elastomer is recorded.

The free radical initiators capable of extracting a proton from the elastomer polymeric chain are chosen among the azo derivates, such as the 4,4'-bis-(di-isobutyronitrile), 4,4'-bis(4-cianopentanoic acid), 2,2'-azobis(2-amidinopropane)dihydrochloride, etc, or among the peroxides, the hydroperoxides, the percarbonates, the peresters and the persalts, for instance the persulphates such as the potassium or the ammonium persulphate. In general the preferred free radical initiators are the peroxides chosen among the t-butyl isopropyl monoperoxycarbonate, t-butyl 2-ethyl esil monoperoxycarbonate, dicumil peroxide, di-t-butyl peroxide, 1,1-di(t-butylperoxy) cyclohexane, 1,1-di(t-butylperoxy)-3,35-trimethylcyclohexane, t butylperoxyacetate, cumil t-butylperoxide, t-butyl peroxybenzoate and t-butyl peroxy-2-ethylhexanoate.

The stable free radical initiator characterized by the group =N—O and by the group =N—O—R' is chosen among those of general formula (III):

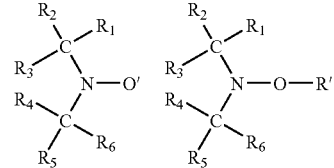

where groups $R_1$, $R_2$, $R_5$, $R_6$ equal to or different one another, are linear or branched alkylic radicals, substituted or not substituted, containing from 1 to 20 atoms of carbon, or alkylaromatic radicals in which the alkylic group contains from 1 to 4 atoms of carbon while groups $R_3$ and $R_4$, equal to or different one another, are equal to $R_1$, $R_2$, $R_5$ e $R_6$ or $R_3$—CNC—$R_4$ is part of a cyclic structure, for instance with 4 or 5 atoms of carbon, possibly merged with an aromatic ring or with a saturated ring containing from 3 to 20 atoms of carbon, in which at least an atom of hydrogen of the cyclic structure can be substituted by an hydroxilic group.

The general formula (III) initiators and their preparation are described in the U.S. Pat. No. 4,581,429.

Some particularly preferred general formula (III) initiators which can be used in the process object of the present invention are 2,2,5,5-tetramethyl-1-pyrrolidinyloxy, known under the PROXYL commercial name, the 2,2,6,6-tetramethyl-1- piperidinyloxy, known under the TEMPO commercial name, the 4-hydroxy-2,2,6,6-tetramethyl-1-piperidinyloxy, known under the 4OH-TEMPO commercial name, and the 1,1,3,3-tetraethylisoindoline-2-hiloxyl, (TEDIO). Other examples of stable initiators which can be used in the process object of the present invention and which correspond to the general formula (III) are described in the above mentioned U.S. Pat. No. 4,581,429.

The polymerization occurs in presence of possible additives, for instance chain transferring agents, anti-oxidation agents, suspension agents, stabilizing agents, and others more, well known to the experts in the present sector. Detailed information can be found in (1) C. B. Bucknall. "Toughened Plastics", Applied Science Publishers Ltd. London, (1977), pages 66-105; (2) A. Echte, "Rubber Toughened Plastics", Advances in Chemistry Series $N^o$ 222, (1989), pages 15-64 (Riew K. C. Ed.); (3) A. E. Platt, "Comprehensive Polymer in Science", Pergamon Press, (1989), vol. 6, pages 437-450; (4) J. L. Hanfeld, B. D. Dalke, "Encyclopedia of Polymer Science and Engineering" $2^{nd}$ edition, Wiley Inter-science, (1989), vol. 16, pages 1-71.

At the end of the polymerization, the polymer is separated from the possible solvent, and from the non reacted monomers which might be in such ratios to be usable without separation one from the other, with the exception of the possible polar copolymers.

To better understand the present invention and to put it into practice, we herewith relate some illustrative non limiting examples.

EXAMPLE 1

Comparative

In a 60 liter batch type autoclave, equipped with a temperature controller and an anchor stirrer system, at room temperature, 2.63 kg of ethylbenzene, 5.06 kg of styrene monomer (SM) and 2.17 kg of polybutadiene INTENE 50 (viscosity in a solution of 5% of styrene monomer=150 CPS) are introduced. The number of revolutions of the stirrer is brought to 80 rpm. The temperature of the system is raised to 80° C. in an hour and maintained constant for another four hours. Thereafter, 28.7 g of Benzoylperoxide (BPO) and 20 g of 4OH-TEMPO are added. The temperature is raised to 105° C. in three hours and maintained constant for another two hours. 24.1 kg of styrene monomer are added to the reaction mixture which is then heated to 125° C. in 30 minutes. The temperature is maintained at this value for six hours. Thereafter the reaction mixture is transferred into a 100 liter autoclave, equipped with Pfaudler stirrer, containing 31.5 kg of demineralized water (at a temperature of 103° C.), 40.5 g of ETHAPOL 1000, 93 g of sodium sulphonated Naphtalen and 33 g of sodium chloride. After the transfer of the polymerization solution is terminated, 30 g of di-tertiary-butylperoxide are added and the revolutions of the stirrer are increased to 270 rpm. The temperature of the mixture is raised to 120° C. in 45 minutes and kept constant for an hour, then is raised to 140° C. in 30 minutes and kept constant for 2 hours and finally it is raised to 155° C. in 45 minutes and kept constant for three hours. When the three hours expire, cooling to 115° C. in 40 minutes follows and the mixture of water and organic material is stripped (5 liter/hour, reintegrating with 5 liters of demineralized water) heating the autoclave to 1450 in three hours. Said temperature is kept for eight hours continuing to strip 5 liters of the water/organic material mixture every hour (reintegrating with 5 liters of demineralized water). Thereafter, cooling to 40° C. follows and the autoclave is unloaded. The thus obtained polymer is filtered and dried at 80° C. for 5 hours.

The laser granulometer analysis of the polymer shows a monomodal elastomeric phase with particles of 0.77 µm (FIG. 1).

EXAMPLE 2

In a 60 liter batch type autoclave, equipped with a temperature controller and an anchor stirrer system, at room temperature, 2.63 kg of ethylbenzene, 6.06 kg of styrene monomer and 1.52 kg of polybutadiene INTENE 50 (viscosity in a solution of 5% of styrene monomer=150 CPS) are introduced. The number of revolutions of the stirrer is brought to 80 rpm. The temperature of the system is raised to 80° C. in an hour and maintained constant for another four hours. Thereafter, 20.1 g of Benzoylperoxide (BPO) and 14 g of 4OH-TEMPO are added. The temperature is raised to 105° C. in three hours and maintained constant for another two hours. Thereafter, the reaction mixture is cooled to 40° C. in one hour and 24.1 kg of styrene monomer and 0.65 kg of INTENE 50 are added to the reaction mixture. The reaction bath temperature is increased back to 80° C. in 30 minutes and 80° C. are maintained for three hours. When the dissolution of the second part of elastomer is terminated, the temperature is raised to 125° C. in 30 minutes. The temperature is maintained at said value for five and a half hours. Thereafter, the reaction mixture is transferred into a 100 liter autoclave, equipped with a Pfaudler stirrer, containing 31.5 kg of demineralized water (at a temperature of 103° C.), 40.5 g of ETHAPOL 1000, 93 g of sodium sulphonated Naphtalen and 33 g of sodium chloride. After the transfer of the reaction mixture is terminated, 30 g of di-tertiary-butylperoxide are added and the revolutions of the stirrer are raised to 270 rpm. The temperature of the mixture is raised to 120° C. in 45 minutes and kept constant for an hour, thereafter it is raised to 140° C. in 30 minutes and kept constant for two hours and finally it is raised to 155° C. in 45 minutes and kept constant for three hours. When the three hours expire, cooling to 115° C. in 40 minutes follows and the mixture water/organic material is stripped (5 liter/hour reintegrating with 5 liters of demineralized water) heating the autoclave to 145° C. in three hours. Said temperature is maintained for eight hours continuing to strip 5 liters of water/organic material mixture every hour (reintegrating with 5 liters of demineralized water). Thereafter, the mixture is cooled to 40° C. and the autoclave is discharged. The thus obtained polymer is filtered and dried at 80° C. for 5 hours.

The laser granulometer analysis of the polymer shows a bimodal elastomeric phase with 62% of big 2.3 µm particles and 38% of small 0.37 µm particles (FIG. 2).

EXAMPLE 3

In a 60 liter batch type autoclave, equipped with a temperature controller and an anchor stirrer system, at room temperature 2.63 kg of ethylbenzene, 6.02 kg of styrene monomer and 2.13 kg of polybutadiene INTENE 40 (viscosity in a solution of 5% in SM=95 CPS) are introduced. The number of revolutions of the stirrer is brought to 80 rpm. The temperature of the system is raised to 80° C. in an hour and maintained constant for another four hours. Thereafter, 28.8 g of Benzoylperoxide (BPO) and 22.6 g of 4OH-TEMPO are added. The temperature is raised to 105° C. in three hours and maintained constant for another two hours. Thereafter the reaction mixture is cooled to 40° C. in one hour and 23.6 kg of styrene monomer and 0.64 kg of INTENE 40 are added to the reaction mixture. The reaction bath is raised back to a temperature of 80° C. in 30 minutes and 80° C. are maintained for three hours. When the dissolution of the second part of elastomer is terminated, the temperature is raised to 125° C. in 30 minutes. The temperature is maintained at said value for five and a half hours. Thereafter, the reaction mixture is transferred in a 100 liter autoclave, equipped with a Pfaudler stirrer, containing 31.5 kg of demineralized water (at a temperature of 103° C.)-40.5 g of ETHAPOL 1000, 93 g of sodium sulphonated Naphtalen and 33 g of sodium chloride. After the transfer of the reaction mixture is terminated, 30 g of di-tertiary-butylperoxide are added and the revolutions of the stirrer are raised to 270 rpm. The temperature of the mixture is raised to 120° C. in 45 minutes and kept constant for an hour; thereafter it is raised to 140° C. in 30 minutes and kept constant for 2 hours, and finally it is raised to 155° C. and kept constant for three hours. When the three hours expire, cooling to 115° C. in 40 minutes follows and the mixture water/organic material is stripped (5 liter/hour reintegrating with 5 liter of demineralized water) heating the autoclave to 145° C. in three hours. Said temperature is maintained for eight hours continuing to strip 5 liters of water/organic material mixture every hour (reintegrating with 5 liters of demineralized water). Thereafter, cooling to 40° C. follows and the autoclave is unloaded. The thus obtained polymer is filtered and dried at 80° C. for 5 hours.

The laser granulometer analysis of the polymer shows a bimodal elastomeric phase with 20% of big 2.1 µm particles and 80% of small 0.3 µm particles (FIG. 3).

EXAMPLE 4

In a 60 liter batch type autoclave, equipped with a temperature controller and an anchor-stirrer system, at room temperature, 2.61 kg of ethylbenzene, 6.09 kg of styrene monomer and 2.15 kg of polybutadiene INTENE 40 (viscosity in a solution of 5% in SM=95 CPS) are introduced. The number of revolutions of the stirrer is brought to 80 rpm. The temperature of the system is raised to 80° C. in an hour and maintained constant for another four hours. Thereafter, 28.5 g of Benzoylperoxide (BPO) and 22.8 g of 4OH-TEMPO are added. The temperature is raised to 105° C. in three hours and maintained constant for another two hours. Thereafter, the reaction mixture is cooled to 40° C. in one hour and 23.9 kg of styrene monomer and 0.21 kg of INTENE 60 (viscosity in 5% SM solution=250 CPS) are added to the reaction mixture. The reaction bath is raised back to a temperature of 80° C. in 30 minutes and 80° C. are maintained for three hours. When the dissolution of the second part of elastomer is terminated, the temperature is raised to 125° C. in 30 minutes. The temperature is maintained at said value for five and a half hours. Thereafter, the reaction mixture is transferred into a 100 liter autoclave, equipped with a Pfaudler stirrer, containing 31.5 kg of demineralized water (at a temperature of 103° C.) 40.5 g of ETHAPOL 1000, 93 g of sodium sulphonated Naphtalen and 33 g of sodium chloride. After the transfer of the reaction mixture is terminated, 30 g of di-tertiary-butylperoxide are added and the revolutions of the stirrer are raised to 270 rpm. The temperature of the mixture is raised to 120° C. in 45 minutes and kept constant for an hour. Thereafter it is raised to 140° C. in 30 minutes and kept constant for 2 hours and finally is raised to 155° C. in 45 minutes and kept constant for three hours. When the three hours expire, cooling to 115° C. in 40 minutes follows and the mixture water/organic material is stripped (5 liter/hour reintegrating with 5 liters of demineralized water) heating the autoclave to 145° C. in three hours. Said temperature is maintained for eight hours continuing to strip 5 liters of water/organic material mixture every hour (reintegrating with 5 liters of demineralized water). Thereafter, cooling to 40° C. follows and the autoclave is unloaded. The thus obtained polymer is filtered and dried at 80° C. for 5 hours.

The laser granulometer analysis of the polymer shows a bimodal elastomeric phase with 20% of big 2.1 µm particles and 80% of small 0.3 µm particles (FIG. 4).

EXAMPLE 5

In a 60 liter batch type autoclave, equipped with a temperature controller and an anchor stirrer system, at room temperature 2.63 kg of ethylbenzene, 6.02 kg of styrene monomer and 2.13 kg of polybutadiene INTENE 40 (viscosity in a solution of 5% in SM=95 CPS) are introduced. The number of revolutions of the stirrer is brought to 80 rpm. The temperature of the system is raised to 80° C. in an hour and maintained constant for another four hours. Thereafter, 28.8 g of Benzoylperoxide (BPO) and 22.6 g of 4OH-TEMPO are added. The temperature is raised to 105° C. in three hours and maintained constant for another two hours. Thereafter the reaction mixture is cooled to 40° C. in one hour and 23.6 kg of styrene monomer and 0.64 kg of INTENE 40 are added to the reaction mixture. The reaction bath is raised back to a temperature of 80° C. in 30 minutes and 80° C. are maintained for three hours. When the dissolution of the second part of elastomer is terminated, the temperature is raised to 125° C. in 30 minutes. The temperature is maintained at said value for five and a half hours. Thereafter, the reaction mixture is transferred in a 100 liter autoclave, equipped with a Pfaudler stirrer, containing 31.5 kg of demineralized water (at a temperature of 103° C.) 40.5 g of ETHAPOL 1000, 93 g of sodium sulphonated Naphtalen and 33 g of sodium chloride. After the transfer of the reaction mixture is terminated, 30 g of di-tertiary-butylperoxide are added and the revolutions of the stirrer are raised to 270 rpm. The temperature of the mixture is raised to 120° C. in 45 minutes and kept constant for an hour; thereafter it is raised to 140° C. in 30 minutes and kept constant for 2 hours, and finally it is raised to 155° C. and kept constant for three hours. When the three hours expire, cooling to 115° C. in 40 minutes follows and the mixture water/organic material is stripped (5 liter/hour reintegrating with 5 liter of demineralized water) heating the autoclave to 145° C. in three hours. Said temperature is maintained for eight hours continuing to strip 5 liters of water/organic material mixture every hour (reintegrating with 5 liters of demineralized water). Thereafter, cooling to 40° C. follows and the autoclave is unloaded. The thus obtained polymer is filtered and dried at 80° C. for 5 hours.

The laser granulometer analysis of the polymer shows a bimodal elastomeric phase with 57% of big 3.1 µm particles and 43% of small 0.36 µm particles (FIG. 5).

EXAMPLE 6

In a 60 liter batch type autoclave, equipped with a temperature controller and an anchor stirrer system, at room temperature, 2.61 kg of ethylbenzene, 6.09 kg of styrene monomer and 2.15 kg of polybutadiene INTENE 40 (viscosity in a solution of 5% in SM=95 CPS) are introduced. The number of revolutions of the stirrer is brought to 80 rpm. The temperature of the system is raised to 80° C. in an hour and maintained constant for another four hours. Thereafter, 28.5 g of Benzoylperoxide (BPO) and 22.8 g of 4OH-TEMPO are added. The temperature is raised to 105° C. in three hours and maintained constant for another two hours. Thereafter, the reaction mixture is cooled to 40° C. in one hour and 23.9 kg of styrene monomer and 0.21 kg of INTENE 60 (viscosity in 5% SM solution=250 CPS) are added to the reaction mixture. The reaction bath is raised back to a temperature of 80° C. in 30 minutes and 80° C. are maintained for three hours. When the dissolution of the second part of elastomer is terminated, the temperature is raised to 125° C. in 30 minutes. The temperature is maintained at said value for five and a half hours. Thereafter, the reaction mixture is transferred into a 100 liter autoclave, equipped with a Pfaudler stirrer, containing 31.5 kg of demineralized water (at a temperature of 103° C.) 40.5 g of ETHAPOL 1000, 93 g of sodium sulphonated Naphtalen and 33 g of sodium chloride. After the transfer of the reaction mixture is terminated, 30 g of di-tertiary-butylperoxide are added and the revolutions of the stirrer are raised to 270 rpm. The temperature of the mixture is raised to 120° C. in 45 minutes and kept constant for an hour. Thereafter it is raised to 140° C. in 30 minutes and kept constant for 2 hours and finally is raised to 155° C. in 45 minutes and kept constant for three hours. When the three hours expire, cooling to 115° C. in 40 minutes follows and the mixture water/organic material is stripped (5 liter/hour reintegrating with 5 liters of demineralized water) heating the autoclave to 145° C. in three hours. Said temperature is maintained for eight hours continuing to strip 5 liters of water/organic material mixture every hour (reintegrating with 5 liters of demineralized water). Thereafter, cooling to 40° C. follows and the autoclave is unloaded. The thus obtained polymer is filtered and dried at 80° C. for 5 hours.

The laser granulometer analysis of the polymer shows a bimodal elastomeric phase with 38% of big 3.6 μm particles and 62% of small 0.36 μm particles (FIG. 6).

Herewith follow some comparative tests that prove that the use of mixtures based on polybutadiene and on a styrene-butadiene block polymer does not lead to obtaining elastomeric particles with a strictly bimodal diameter distribution.

Test 1

In a 60 liter batch type autoclave, equipped with a temperature controller and an anchor stirrer system, a solution is made using 4.2 kg styrene butadiene 40/60 BUNA BL 6533 TC (BAYER) (viscosity in an 5% SM solution=40 CPS), 0.90 kg of Vaseline oil PRIMOL 352 (ESSO) and 30 g of antioxidant agent ANOX PP 18 in 24.9 styrene monomer, stirring for 5 hours at 85° C. Then, 24 g of transferring agent TDM are added and the pre-polymerization with grafting and phase inversion is performed, heating and stirring the thus obtained solution for 5 hours and 30 minutes at 120° C. During the pre-polymerization two doses of 3 g of TDM are added after 3 hours and after 5 hours from the start of the heating to 120° C. At the end the pre-polymer is transferred into a second 100 liter autoclave equipped with a Pfaudler stirrer and it is suspended in a water phase (water/organic material ratio=1/1) containing NaCl (0.11% in weight), sodium naphtalensulfonate (0.31% in weight) and ETHAPOL 1000 (0.13% in weight). 30 g of di-tertiary-butylperoxide are added and the polymerization is performed up to the total conversion of the monomer and the total reticulation of the elastomer phase, heating while stirring for an hour at 120° C., for 2 hours at 140° C., for 3 hours at 155° C. When the three hours expire cooling to 1150 in 40 minutes follows and the mixture of water and organic material is stripped (5 liter/hour, reintegrating with 5 liters of demineralized water) heating the autoclave at 145° C. in three hours. Said temperature is maintained for eight hours continuing to strip 5 liters of mixture water/organic material every hour (reintegrating with 5 liters of demineralized water). Thereafter, cooling at 40° C. follows and the autoclave is unloaded. The polymer in bead form is washed, dried at 80° C. for 5 hours and granulated in an extruder.

The laser granulometer analysis shows a monomodal elastomeric phase with particles from $D(4,3)=0.38$ μm (FIG. 7).

Test 2

Test 1 is repeated, the only difference being that in place of using only the copolymer BUNA 6533 TC a mixture is used, constituted by 3.6 kg of copolymer BUNA BL 6533 TC and by 0.6 kg of polybutadiene INTENE 60 AF (viscosity in 5% SM solution=250 CPS).

The laser granulometer analysis of the polymer shows a monomodal elastomeric phase with particles of $D(4,3)=0.43$ μm (FIG. 8).

Test 3

The test 1 is repeated the only difference being that in place of using only the copolymer BUNA BL 6533 TC a mixture is used constituted by 2.9 kg of copolymer BUNA BL 6533 TC and by 1.3 kg of polybutadiene INTENE 60 AF (viscosity in 5% solution of SM=250 CPS).

The laser granulometer analysis of the polymer shows a monomodal elastomeric phase with particles of $D(4,3)=0.61$ μm (FIG. 9).

Test 4

The test 2 is repeated the only difference being that in place of the copolymer BUNA BL 6533 TC a copolymer with the same composition is used (NS 318 S Nippon Zeon), but with an even lower viscosity in solution (viscosity in 5% SM solution=10 CPS).

The laser granulometer analysis of the polymer shows a monomodal elastomeric phase with particles of $D(4,3)=0.43$ μm (FIG. 10).

Test 5

Test 3 is repeated the only difference being that in place of the copolymer BUNA BL 6533 TC a copolymer with the same composition (NS 318 S Nippon Zeon) is used, but with an even lower viscosity in solution (viscosity in 5% SM solution=10 CPS).

The laser granulometer analysis shows a monomodal elastomeric phase with particles of $D(4,3)=0.65$ μm (FIG. 11).

The invention claimed is:

1. A process for the preparation of a high-impact vinylaromatic (co)polymer grafted on an elastomer, which comprises:
   a) dissolving a first portion ($X_1$) of an elastomer in a liquid phase comprising a vinylaromatic monomer and optionally solvent of polymerization to produce a solution;
   b) adding to the solution from as a functionalization and polymerization catalytic system comprising a free radical initiator (G), with F functionality, capable of extracting a proton from the elastomer polymeric chain and a stable free radical initiator comprising the group =N—O or the group =N—O—R' (I), with molar ratios (I)G·F from 1 to 3, F being equal to the number of functional groups per initiator molecule which, through decomposition, produce two free radicals, wherein R' is an (iso)alkyl radical $C_1$-$C_6$ or an aryl alkyl radical $C_7$-$C_{20}$, optionally containing heteroatoms;
   (i) functionalizing the first portion ($X_1$) of elastomer with the catalytic system by heating, while stirring, the mixture from b) at a temperature from 80 to 110° C. to produce a functionalized elastomer;
   (ii) mixing of the functionalized elastomer from (i) with to second portion ($X_2$) of the elastomer to obtain an elastomeric homogeneous composition;

(iii) optionally mixing the elastomeric homogeneous composition from (ii) with additional liquid phase essentially constituted by a vinylaromatic monomer and/or solvent of polymerization, (iv) polymerizing the vinylaromatic monomer, at a temperature higher or equal to 120° C., wherein the weight ratio of the vinylaromatic monomer/solvent is from 60/40 to 100/0 and the weight ratio $X_1+X_2$/vinylaromatic monomer is greater than or equal to 8/92;

(v) recovering, at the end of the polymerization, a vinylaromatic (co)polymer grafted on the elastomer, wherein the vinylaromatic (co)polymer grafted on the elastomer comprises a rigid matrix formed by a vinylaromatic (co)polymer and an elastomeric phase dispersed in the matrix in the form of particles with a strictly bimodal diameter distribution, wherein the particles comprise a first class having a volume average dimension of from 0.15 to 0.50 μm and a second class having a volume average dimension of from 1 to 8 μm, with a total absence of particles having dimensions between the volume average dimension of the first and second class of particles.

2. The process of claim 1, wherein the polymerizing (iv) is conducted in presence of one or more comonomers.

3. The process of claim 1, which comprises (iii).

4. The process of claim 1, further comprising:
(vi) recycling the solvent/monomer mixture coming from the recovery phase, at stage (i).

5. The process of claim 1, wherein the functionalization of the elastomer is carried out in a melted state.

6. The process of claim 1, wherein the functionalization of the elastomer is carried out in a solvent.

7. The process of claim 6, wherein the solvent for functionalization of the elastomer is the same solvent used during the polymerization.

8. The process of claim 1, wherein the mixing of the functionalized elastomer ($X_1$) from (i) with the second portion of elastomer ($X_2$) is carried out in a solvent.

9. The process of claim 8, wherein the solvent for the mixing of the functionalized elastomer ($X_1$) from (i) with the second portion of elastomer ($X_2$) is the same solvent used during polymerization.

10. The process of claim 1, wherein the weight ratio of the first portion $X_1$ and the second portion $X_2$ of elastomer is from 99/1 to 40/60.

11. The process of claim 1, wherein the elastomer is a polybutadiene copolymer with an numeric average molecular weight (Mn) from 50,000 to 350,000 and weighted average molecular weight (Mw) from 100,000 to 500,000.

12. The process of claim 1, wherein the elastomer is selected from the group consisting of ethyl propylene (EPR) and EPDM rubbers.

13. The process of claim 1, wherein the functionalization and polymerization catalytic system is added in quantities from 0.1 to 2.5% in weight relative to the total amount of the elastomer in the first portion ($X_1$) and the second portion ($X_2$).

14. The process of claim 1, wherein the free radical initiator capable of extracting a proton from the elastomer polymeric chain is selected from the group consisting of azo derivates, peroxides, hydroperoxides, percarbonates, peresters and persalts.

15. The process of claim 1, wherein the stable free radical initiator is chosen among those of general formula (III):

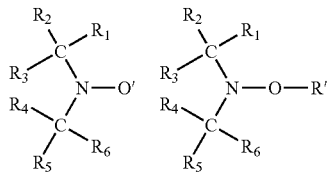

wherein the groups $R_1$, $R_2$, $R_5$ and $R_6$, equal to or different one another, are free linear or branched alkyl radicals, substituted or not substituted, containing from 1 to 20 carbon atoms or alkyl aromatic radicals in which the alkyl group contains from 1 to 4 carbon atoms while the groups $R_3$ and $R_4$, equal to or different one another, are equal to $R_1$, $R_2$, $R_5$ and $R_6$ or $R_3$—CNC—$R_4$ is part of a cyclic structure, possibly merged with an aromatic ring or with a saturated ring containing from 3 to 20 carbon atoms, in which at least a hydrogen atom of the cyclic structure can be substituted by a hydroxyl group.

16. The process of claim 1, in which the stable free radical initiator is selected from the group consisting of 2,2,5,5-tetramethyl-1-pyrrolidinyloxy, 4-hydroxy-2,2,6,6-tetramethyl-1-piperidinyloxy, and 1,1,3,3-tetraethylisoindoline-2-hydroxy.

* * * * *